Nov. 16, 1965   J. S. ECKERT   3,217,469
FEED DEVICE FOR GAS-AND-LIQUID CONTACT TOWER
Filed March 21, 1963   2 Sheets-Sheet 1
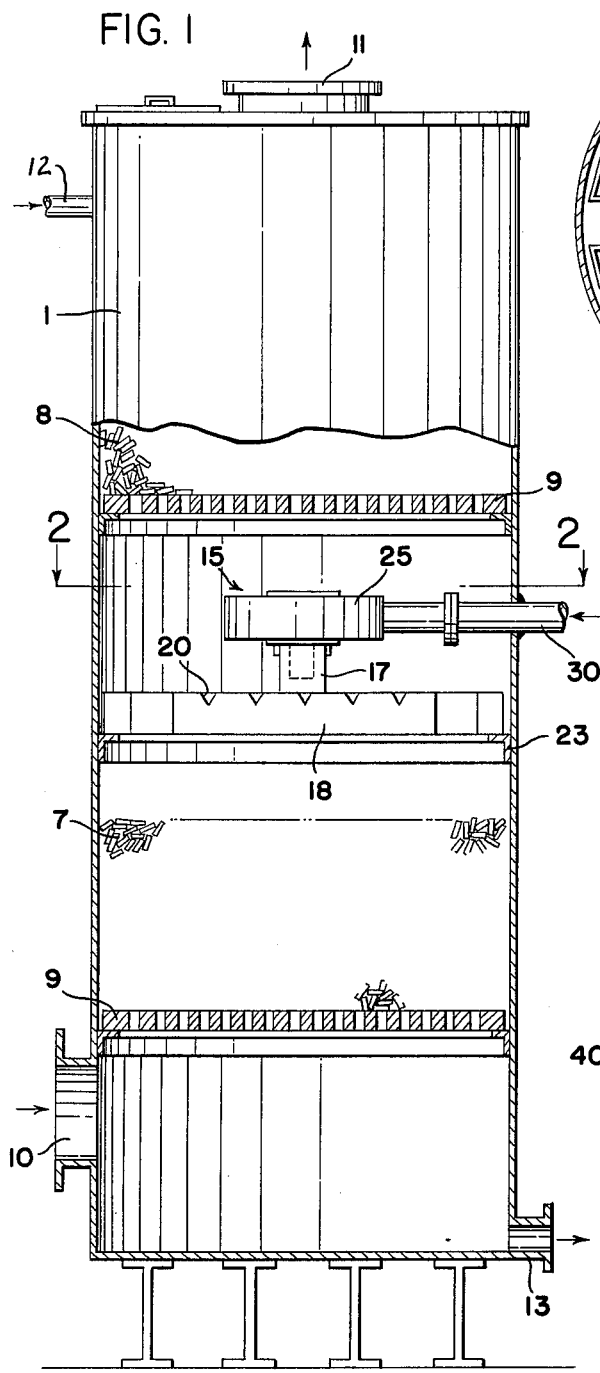
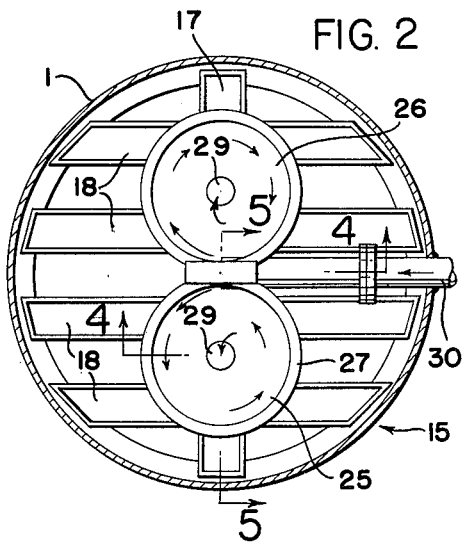
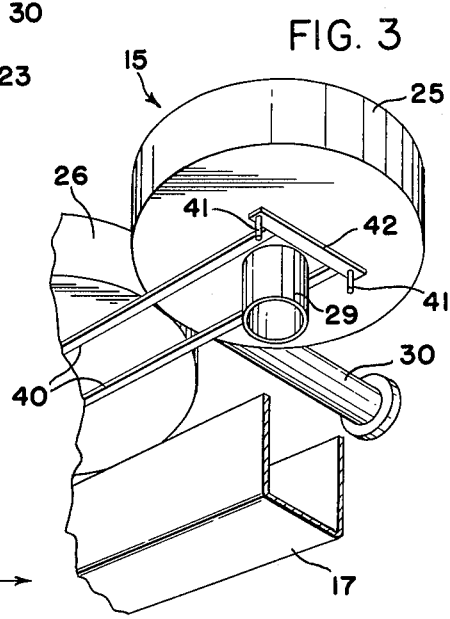
INVENTOR.
JOHN S. ECKERT
BY *Gordon C. Mask*
ATTORNEY

INVENTOR.
JOHN S. ECKERT

United States Patent Office 3,217,469
Patented Nov. 16, 1965

3,217,469
FEED DEVICE FOR GAS-AND-LIQUID
CONTACT TOWER
John S. Eckert, 3000 Millboro, Silver Lake, Ohio
Filed Mar. 21, 1963, Ser. No. 266,923
6 Claims. (Cl. 55—204)

The invention relates to a feed device for gas-and-liquid contact towers, especially for the feed of gas and liquid mixtures, such as mixed vapor feeds in distillation towers, and flushing liquids such as carbonate and ammonia regenerators.

The feed device separates entrained gas from a liquid and may be used between two beds of packing elements, or it may be used in the top of a tower above the top bed of packing elements to induce turbulence which facilitates the release of gas. The liquid drains from the feed device into any suitable distributor above a lower bed of packing elements. The device is small and presents minimum interference with gas passing up through the tower, and with liquid flowing down through the tower.

The feed device is simple. It includes two open-topped pans, side by side, with a drain in each. The inlet enters both pans at a tangent. Baffles on the walls of the pans cause separation of the gas and liquid in the feed. The device is preferably designed to rest on a distributor, and is provided with means for holding the device on the distributor.

The invention is further described in connection with the accompanying drawings, in which:

FIGURE 1 is an elevation of a gas-and-liquid contact tower with a part of the wall broken away to show two beds of packing elements with the feed device on a distributor between them;

FIGURE 2 is a plan view on the line 2—2 of FIGURE 1;

FIGURE 3 is a view of the bottom of the feed device on an enlarged scale;

Figure 4:
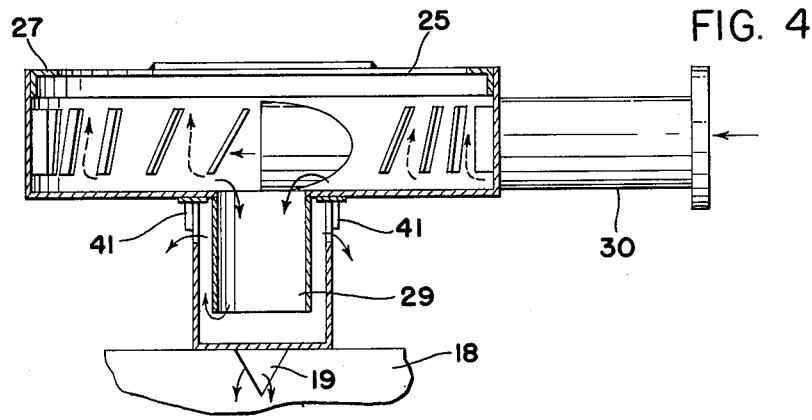
FIGURE 4 is a detail, on a still larger scale, of the feed device on the line 4—4 of FIGURE 2.
Figure 5:
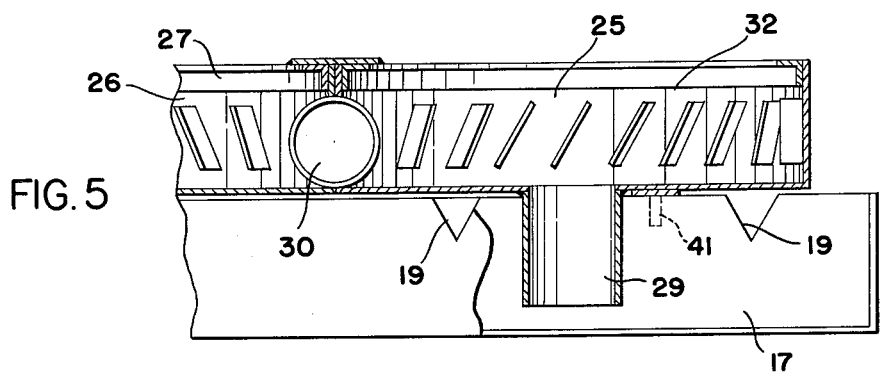
FIGURE 5 is a detail on the same scale, taken on the line 5—5 of FIGURE 2.
Figure 6:
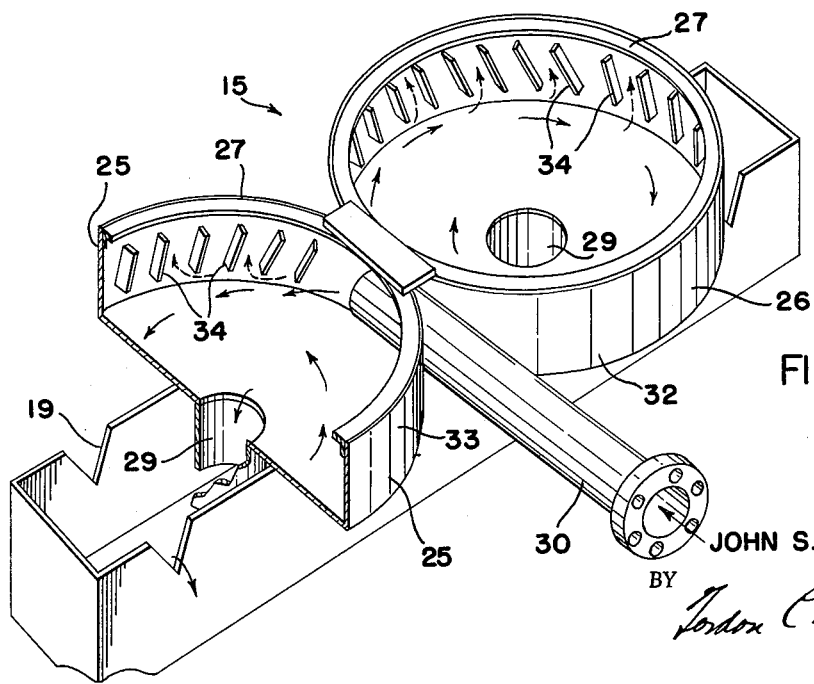
FIGURE 6 is a view of the feed device from above, on a larger scale than used in FIGURES 1 and 2.

The tower 5 is illustrated as a steel tower. It may be made of ceramic bricks or any suitable construction. The beds 7 and 8 of packing elements are held on support plates 9. These support plates may be of any suitable design. Gas enters at 10 and leaves at 11. Liquid enters at 12 and leaves at 13.

The feed device 15 of this invention is shown as being supported on the distributor tray 17 which rests on four distributor troughs 18. There are V-weirs 19 in the tray to supply liquid to each trough, and each trough is provided with V-weirs 20 to distribute the liquid over the bed 7. The distributor rests on the angle 23. It is to be understood that the means of distribution is illustrative; any distributor means may be employed, and it may rest directly on the lower bed 7 instead of being supported from the wall of the tower.

The feed device includes the two pans 25, 26 each of which has an opening in the top outlined by the narrow rim 27. Each is provided with a drain 29 which drains into the trough 17.

The feed inlet 30 is tangential to both pans and delivers the gas-liquid mixture at sufficient velocity to cause it to follow the walls 32 and 33 a sufficient distance to cause the impact with the baffles 34, along with centrifugal action to convent the velocity energy to turbulence and then separate gas from the liquid. Any suitable baffling means may be used for this purpose, depending upon the degree of turbulence required.

The pans are held together by the braces 40. The lugs 41 at the ends of the cross braces 42 fit over the trough 17 and hold the feed device in position.

In the treatment of hot potassium bicarbonate, for example, it may enter an inlet which is 6 inches in diameter at the rate of 400 gallons per minute into pans 16 inches in diameter, with cylindrical walls 10 inches in height. The baffles induce turbulence in the liquid, thereby "springing" the gas. Likewise, the swirl of the liquid in the bottom of the pan and against the walls, tends to separate the gas. The turbulence prevents super-heating and starts the gas flashing from the liquid.

More than two pans might be used, with streams of liquid entering tangential to each, but only two pans will generally be most satisfactory.

The invention is covered in the claims that follow.

What I claim is:

1. A feed separator for a gas-and-liquid contact tower which includes a pan which has an essentially imperforate, substantially vertical, cylindrical wall, the pan being open at the top and having a drain in the bottom for draining liquid therefrom, the drain being small enough to prevent the entrance of any substantial amount of gas, and a feed inlet which is substantially tangential to the wall for the introduction of a gas and liquid mixture which is thereby directed into contact with the wall, with substantially vertical baffles on the inner surface of the wall and projecting inwardly therefrom at the same elevation as the feed inlet to convert the velocity energy of the feed to turbulence.

2. A feed separator for a gas-and-liquid contact tower which comprises two pans side-by-side, each with a substantially imperforate, substantially vertical, cylindrical wall, the pans being open at the top and having a drain in the bottom for draining liquid therefrom, the drain being small enough to prevent the entrance of any substantial amount of gas, a feed inlet between the pans which is substantially tangential to both pans for the introduction of a gas and liquid mixture which is thereby directed into contact with the walls, with substantially vertical baffles on the inner surface of said wall of each of the pans and projecting inwardly therefrom at the same elevation as the feed inlet to convert the velocity energy to turbulence.

3. The feed separator of claim 2 in which the drain is near the middle of the bottom of each pan and braces at the sides of the drains connect the pans.

4. A gas-and-liquid contact tower having therein a feed separator which comprises a pan with an essentially imperforate, substantially vertical, cylindrical wall, the pan being open at the top and having a drain in the bottom for draining liquid therefrom, the drain being small enough to prevent the entrance of any substantial amount of gas, and a feed inlet which is substantially tangential to the wall for the introduction of a gas and liquid mixture which is thereby directed into contact with the wall, with substantially vertical baffles on the inner surface of the wall and projecting inwardly therefrom at the same elevation as the feed inlet to convert the velocity energy of the feed to turbulence, and gas-and-liquid contact means in the tower below the pan.

5. The tower of claim 4 with a distributor between the gas-and-liquid contact means and the drain in the pan.

6. A gas-and-liquid contact tower having therein a feed separator which comprises two pans side-by-side, each with a substantially imperforate, substantially vertical, cylindrical wall, the pans being open at the top and having a drain in the bottom for draining liquid therefrom, the drain being small enough to prevent the entrance of any substantial amount of gas, a feed inlet between the pans which is substantially tangential to the cylindrical walls of both pans for the introduction of a gas-and-liquid mixture which is thereby directed into contact with the walls, with substantially vertical baffles on the inner surface of said wall of each of the pans and projecting inwardly therefrom at the same elevation as the feed inlet to convert the velocity energy to turbulence, and gas-and-liquid contact means in the tower below the pan.

References Cited by the Examiner

UNITED STATES PATENTS

| | | | |
|---|---|---|---|
| 2,316,729 | 4/1943 | Tryon | 55—203 |
| 2,560,072 | 7/1951 | Bloomer | 55—345 X |
| 2,575,607 | 11/1951 | Wallin | 55—349 |
| 2,711,644 | 6/1955 | Myers | 55—199 |
| 2,874,798 | 2/1959 | Walker | 202—158 X |
| 2,952,330 | 9/1960 | Winslow | 55—202 |
| 2,979,315 | 4/1961 | Eckert | 202—158 |
| 2,998,234 | 4/1961 | Haselden | 202—158 X |
| 3,131,043 | 4/1964 | Burdock | 55—346 |

FOREIGN PATENTS

| | | |
|---|---|---|
| 634,153 | 8/1936 | Germany. |
| 918,105 | 2/1963 | Great Britain. |

REUBEN FRIEDMAN, *Primary Examiner.*